(No Model.) 12 Sheets—Sheet 1.
L. MILLER.
GRAIN BINDER.

No. 571,072. Patented Nov. 10, 1896.

Witnesses.
F. L. Ourand
Inventor.
Lewis Miller
by All Smith
Attorney.

(No Model.) 12 Sheets—Sheet 3.

L. MILLER.
GRAIN BINDER.

No. 571,072. Patented Nov. 10, 1896.

WITNESSES
F. L. Ourand
Rex. Smith

INVENTOR
Lewis Miller
by A. M. Smith
Attorney (No Model.) 12 Sheets—Sheet 4.

L. MILLER.
GRAIN BINDER.

No. 571,072. Patented Nov. 10, 1896.

WITNESSES

INVENTOR
Lewis Miller
by A. M. Smith
Attorney (No Model.)　　　　　　　　　　　　　　　12 Sheets—Sheet 6.
L. MILLER.
GRAIN BINDER.

No. 571,072.　　　　　　　　　　Patented Nov. 10, 1896.

Fig. 17.

Witnesses:　　　　　　　　　　　　　Inventor:
Rex Smith　　　　　　　　　　　　　Lewis Miller,
B. Beaman,　　　　　　　　　　　　by Sill Smith,
　　　　　　　　　　　　　　　　　Attorney (No Model.)
12 Sheets—Sheet 8.

L. MILLER.
GRAIN BINDER.

No. 571,072.  Patented Nov. 10, 1896.

Fig. 19.

Witnesses:
Rex. Smith
B. Brauman

Inventor
Lewis Miller
by A. M. Smith
Attorney (No Model.)  12 Sheets—Sheet 10.

L. MILLER.
GRAIN BINDER.

No. 571,072.  Patented Nov. 10, 1896.

Fig.21.

Witnesses:

Inventor:
Lewis Miller,
by A.L. Smith
Attorney (No Model.) 12 Sheets—Sheet 11.

L. MILLER.
GRAIN BINDER.

No. 571,072. Patented Nov. 10, 1896.

Witnesses:
Rex. Smith
B. Beaman

Inventor:
Lewis Miller
by A.L. Smith
Attorney (No Model.)  12 Sheets—Sheet 12.
L. MILLER.
GRAIN BINDER.

No. 571,072.  Patented Nov. 10, 1896.

Witnesses
J. N. Witherow
E. A. Balloch

Inventor,
Lewis Miller;
By his Attorneys,
Baldwin, Davidson & Wight.

UNITED STATES PATENT OFFICE.

LEWIS MILLER, OF AKRON, OHIO.

GRAIN-BINDER.

SPECIFICATION forming part of Letters Patent No. 571,072, dated November 10, 1896.

Application filed April 27, 1886. Serial No. 200,321. (No model.)

*To all whom it may concern:*

Be it known that I, LEWIS MILLER, a citizen of the United States, residing at Akron, in the county of Summit and State of Ohio, have invented certain new and useful Improvements in Grain-Binders, of which the following is a specification.

My invention more especially relates to automatic grain-binders of that type known as "cord-knotters," in which the sheaf is bound with cord, and to that class of such binders in which the knot is formed by a tying-bill coöperating with cord-carrying and cord-clamping devices.

The objects of my invention are to simplify the construction of the apparatus while increasing its efficiency, and particularly to provide means for properly guiding and holding the cord while rendering it capable of yielding up slack enough for the proper formation of the knot.

The accompanying drawings represent so much only of a completely-organized grain-binding harvester as is necessary to illustrate the invention claimed.

That side of the apparatus at which the grain is delivered by the apron, elevator, or raking mechanism I term the "feed" or "grain" side. The opposite side of the apparatus I term the "discharge" or "stubble" side. That portion nearest the team I term the "front," the other the "rear," of the binding mechanism.

Figs. 18 to 27, inclusive, while showing my invention as embodied in substantially the same form of apparatus as that shown in the preceding figures, show an apparatus in which the details of construction are somewhat modified.

The drawings show an ordinary binder-gear standard-sleeve A, in which the actuating-shaft B has its bearings. A driving-cam C, rotating with this shaft, carries a front bundle-discharging arm C'. A second or rear bundle-discharger $C^2$ is secured to the rear end of and rotates with the shaft B.

Figures 5, 6, 13, 14:
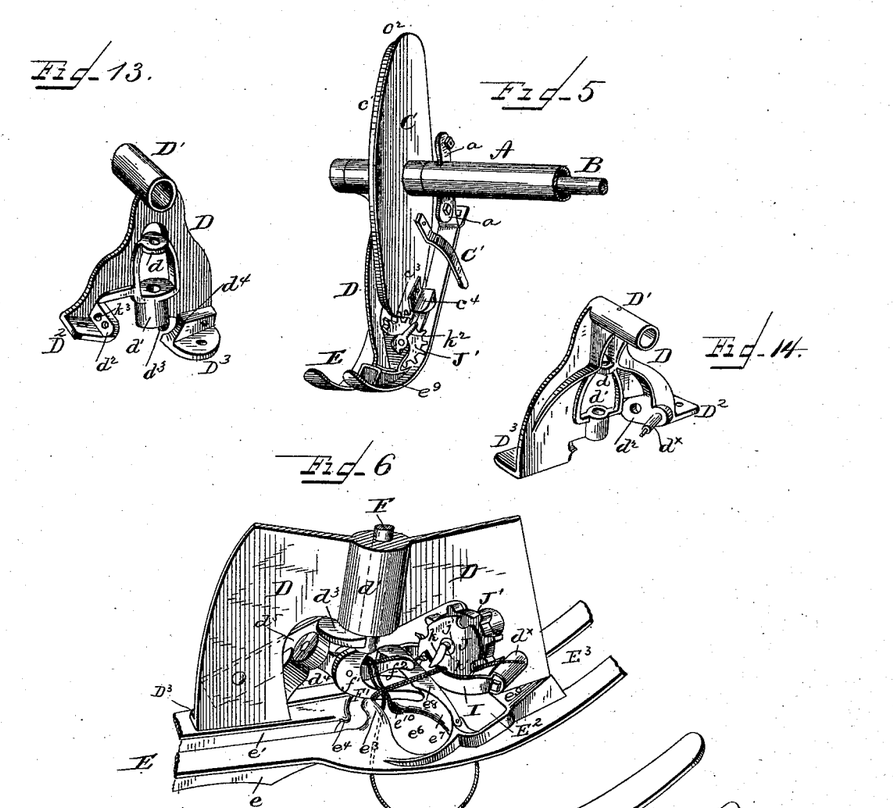
Fig. 5 is a view in perspective as seen from the front and stubble side, showing the position just before discharging the bundle.
Fig. 6 is a view in perspective, on an enlarged scale, from the rear and grain side, showing the breastplate, knotter, and holder in the attitude they assume just before the jaws of the tying-bill close on the cord before it is cut.
Fig. 13 is a view in perspective of the knotter-frame detached as seen from the front and stubble side.
Fig. 14, a similar view of the opposite side of the same as seen from the rear and grain side.

A knotter frame or stand is suspended from the shaft B by means of a loose sleeve D' thereon interposed between the driving-cam and the rear bundle-discharging arm $C^2$. Figs. 13 and 14 show the details of this frame, which consists, essentially, of a vertical flat plate D, (standing at right angles to the shaft and parallel with the driving-cam,) substantially triangular in outline when seen in side view and united at its apex to the shaft by its sleeve D', as before explained. This frame is secured to and supports the breastplate E by means of bolts passing through suitable laterally-projecting flanges or feet $D^2 D^3$. These feet, it will be observed, project only on the front side of the plate D, the rear edge of which lies close to and parallel with the front wall of the binder-arm slot in the breastplate E and the vertical plane in which the needle and its curved grain-guard move. This organization enables me to diminish the width of the rear part of the breastplate, and consequently to bring the rear or outer discharging-arm $C^2$ close to the path of the needle, thereby facilitating the entrance of the discharging-arm into the opening made by the needle and its guard between the bound bundle and the loose following grain. The breastplate is further supported by means of a bifurcated arm or brace, the branches $b' b^2$ of which are respectively secured to lugs or ears $a\ a$, formed one on the upper and the other on the lower side of the sleeve A, close to the driving-cam C. These branches converge into a plate $b$, secured to the grain end of the shield.

Figure 12:
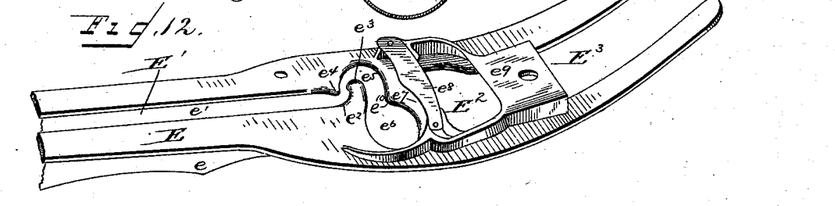
Fig. 12 is a view in perspective from the rear and grain side of the central portion of the breastplate, showing particularly the bridges and guide bars or plates.

The breastplate E is of a form well known in its general features, but materially modified and improved by me in detail and organization, as shown in the drawings. Its grain end rises in prow shape, its beak being secured to the forked braces $b' b^2$ at their junction, as before explained, while its inner portion is bolted to the frame suspended from the shaft A, as hereinbefore described. Its contour or outline in plan view is clearly shown in Fig. 9. It is provided with a grainward longitudinal slot E', traversed by the needle and cord, as hereinafter explained. The rear wall of the slot E' is curved at $e^2$, as indicated in Fig. 12, and merges into the blunt-pointed finger of $e^3$. Pendent parallel fins or ribs $e\ e'$ on each side of the slot underneath the breastplate serve to stiffen it vertically, as well as to press down the inflowing grain and keep it from being carried into or through the slot by the needle. The lowest point of the fins is just grainward of the path of the needle, and their under edges thence gradually curve upward toward the breastplate to a point beneath the knotter where they rise steeply and terminate abruptly, (see Fig. 7,) thus allowing the bundle gradually to be drawn close up to the under side of the breastplate at the point where the knot is formed. The slot gradually contracts as it approaches the knotter or tying-bill, at a point grainward of which its front wall extends inward rearwardly and forms a teat or spur $e^4$, stubbleward of which the slot curves forward in a semicircle which is continued backward across the axis of the slot, as indicated at $e^5$, where it forms an inclined projection or spur $e^{10}$, whence it is still further curved backward to form an enlarged eye or loop $e^6$, through which the completed knot escapes from the jaws of the tying-bill. The rear wall of the slot gradually inclines forward, as shown at $e^2$, past the spur $e^4$, beyond which it terminates in a recurved, horn-shaped, blunt-pointed finger $e^3$, which extends athwart the slot well beyond the spur $e^4$. The back of the finger comes round and joins the other wall, thus completing the contour of the eye or loop before described. The purpose of this construction will be hereinafter explained. A bridge $e^7$ separates this eye or loop from a second slot $E^2$, which is further separated from a third slot $E^3$ by a bridge $e^9$. The purposes of this organization will be hereinafter explained.

Figure 9:
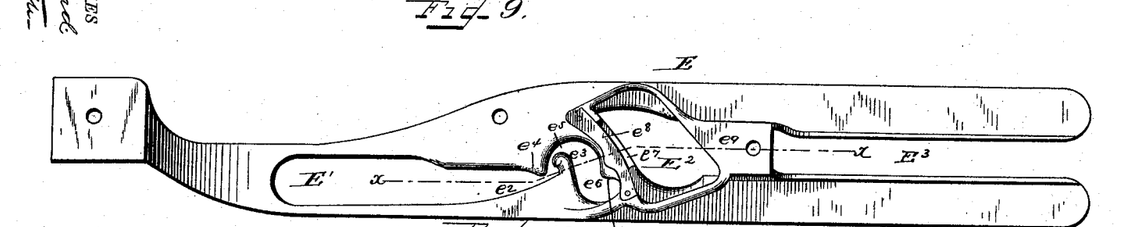
Fig. 9 shows a plan view of the shield or breastplate detached.
Figure 10:
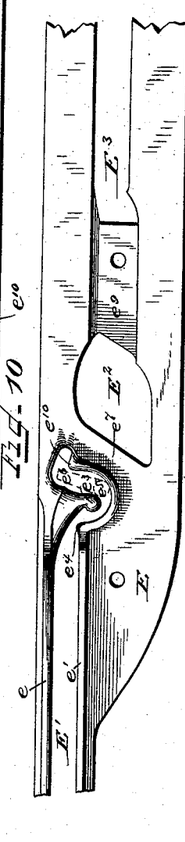
Fig. 10, an inverted or bottom plan of the same, showing in dotted lines the normal relation of the tying-bill and slot.
Figure 11:
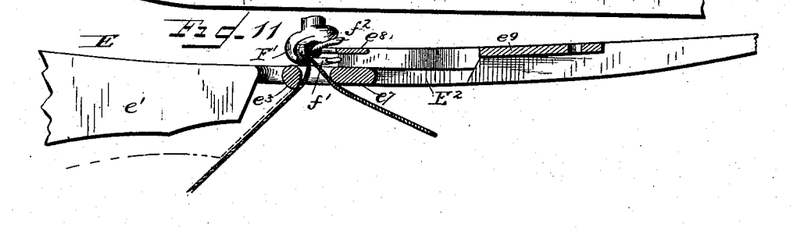
Fig. 11, a vertical longitudinal section through the breastplate on the line *x x* of Fig. 9, with the tying-bill and cord in the position they occupy just before the knot is completed, as in Fig. 6.

A cord-supporting guide-bar $e^8$ is supported above but parallel with the first bridge $e^7$ by flanges on the breastplate, Figs. 9, 11, and 12, and serves to guide the strands positively into the jaws of the bill, as hereinafter explained.

Figure 7:
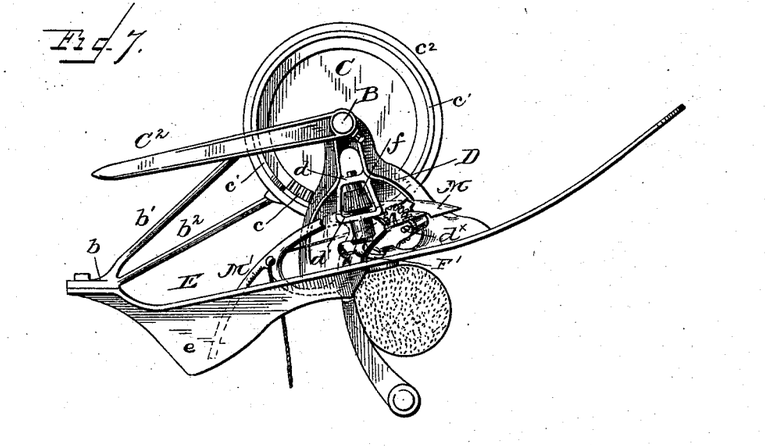
Fig. 7 shows a rear elevation with the parts in the relative position they occupy just prior to the beginning of the rotation of the tying-bill, the needle or binder-arm being shown in its most advanced position to lay the cord over the cord guide, knotter, and holder, with a portion of it broken away to show the parts behind it.

The binder-arm or needle M and grain-guard M', being organized and operating in usual well-known ways, need no particular description here. They are shown in Fig. 7 and other figures.

Figures 1, 4:
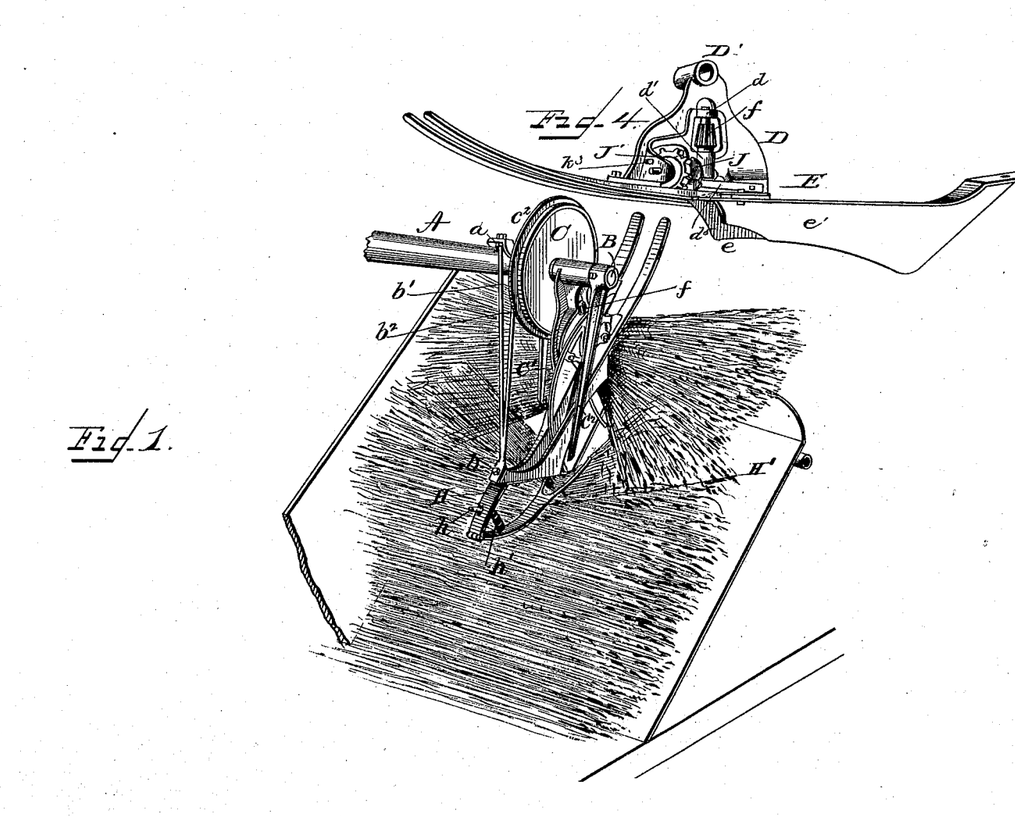
Figure 1 shows a view in perspective from the rear and grain side, showing the relation of the parts at the moment preceding the discharge of the bundle or sheaf.
Fig. 4 is a perspective view of the breastplate and knotter frame or stand.

A short arm H, projecting inwardly and downwardly from the grain end of the breastplate, has one end of a bifurcated guard-arm H' hinged to it, the other or bifurcated end extending to a point beyond the path of the needle which rises between its prongs. A rod $h$, interposed between the arm and guard and encircled by a coiled spring $h'$, causes the guard to exert a yielding pressure on the grain passing beneath it, and thus prevents its being lifted by the needle or guard and assists them in separating the grain. (See Fig. 1.)

The knotter or tying-bill F' is of well-known construction, having a lower fixed jaw $f'$ and an upper one $f^2$, movable vertically on a pivot by means of a friction-roller journaled on its heel extension and acted upon at proper times by cams $d^3$ $d^4$ on the knotter-frame, (see Figs. 6 and 13,) and a plate-spring $d^5$, secured on the knotter-frame in a way well understood.

Figure 22:
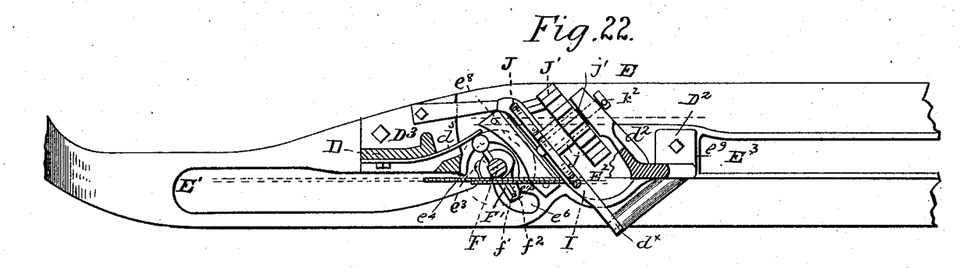
Fig. 22 is a plan view, partly in horizontal section, showing the attitude of the guide-finger, tying-bill, and holder represented in Fig. 18; that is, just after the binder-arm has advanced, leaving a second strand of cord in the holder and the knotter just beginning to act on the cord.

The knotter is carried on the lower end of a spindle F, turning in bearings $d$ $d'$ in the knotter-frame and having on its upper end a bevel-pinion $f$ with which the teeth of a segment-gear or sector-rack $c$ on the rear face of the driving-cam mesh at suitable intervals to rotate the tying-bill intermittently. The organization is such that the tying-bill normally stands above and parallel with the eye of the slot (see Fig. 22) and the line of discharge of the knot; that is, pointing backward at an acute angle to the axis of the slot E', across which it extends. The axis of the knotter-spindle is in line with the front wall of the slot, so as to allow the needle to lay the cord close to it.

A rim or flange $c'$ entirely encircles the rear face of the cam-wheel, except that part occupied by the sector-gear, and bears on a delay-surface on the knotter-spindle to prevent its rotation, except when the knot is being formed as usual.

The knotter-frame is provided with suitable stiffening ribs or flanges, Figs. 13 and 14, thus rendering it stiff and light. An upright flange or lip $d^2$, preferably connected with the outer foot-flange, is arranged obliquely thereto and provided with an eye or short sleeve, in which the tubular shaft of the cord-holding disk is secured. The cam-faced projection $d^4$ on the opposite or grainward foot-flange acts on the friction-roller on the heel of the pivoted jaw of the tying-bill to close its jaws at the proper time. The cam $d^3$ on the lower end of the knotter-spindle bearing $d'$ opens the movable jaw by acting on its roller in advance of the action of the cam $d^4$ in a well-known way. (See Fig. 6.)

Figures 2, 3, 15, 16:
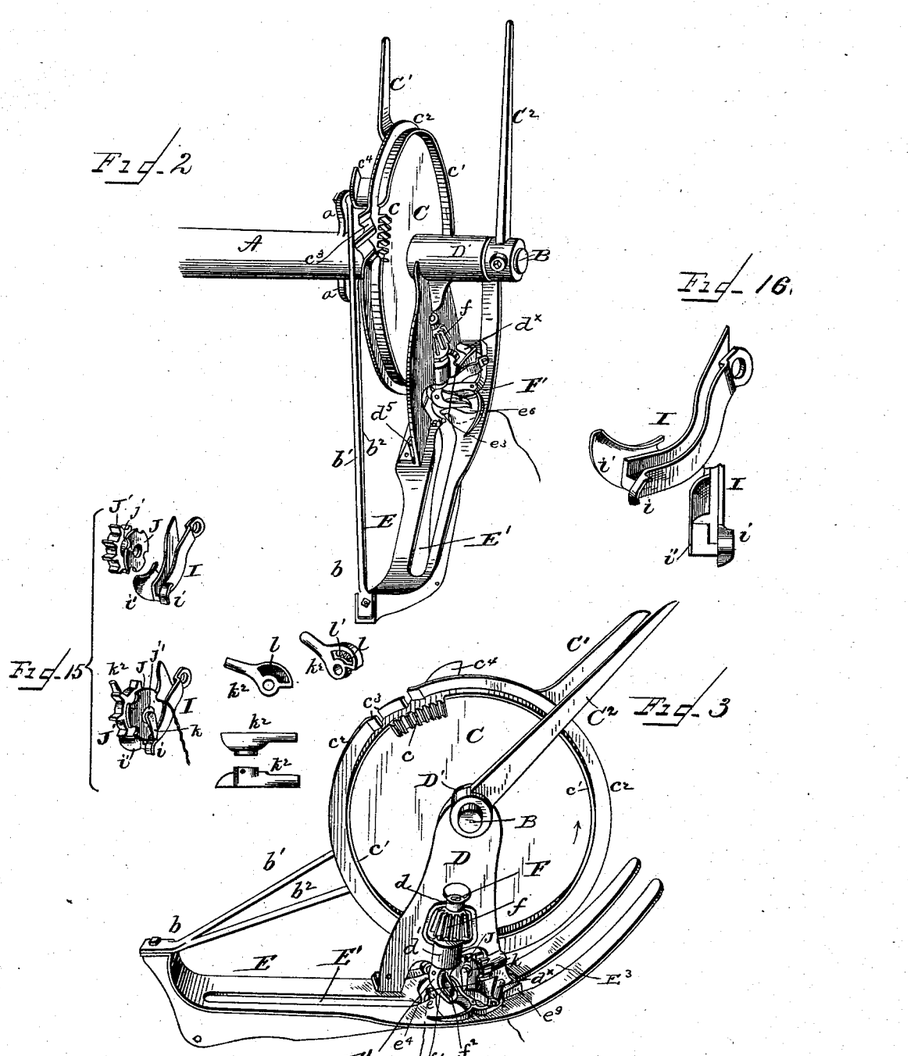
Fig. 2 shows a similar view of the binder-head with the parts in their normal attitude after the bundle has been discharged.
Fig. 3 is a perspective rear view of the same.
Fig. 15 shows detached detail views of the cord-holding and cord-cutting devices.
Fig. 16 shows similar views, on an enlarged scale, of the guide-trough in which the holder-disk rotates.
Figure 8:
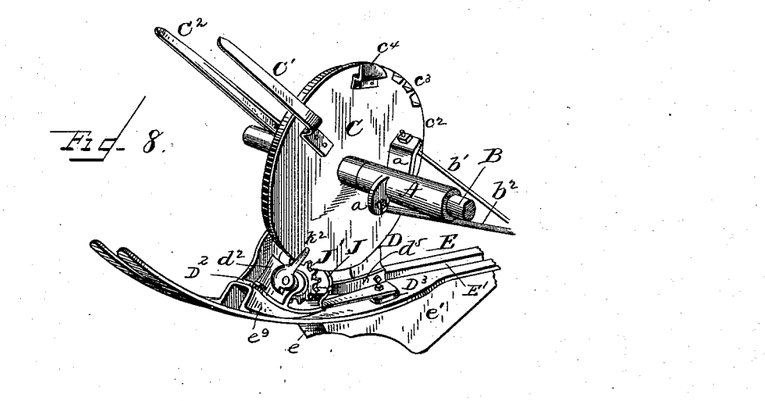
Fig. 8 is a detail view in perspective from the front and stubble side, showing the parts in the attitude they assume after discharging the bundle.

My improved cord holder and carrier is composed, essentially, of a grooved trough-shaped shoe I and a notched disk revolving therein. This shoe is of the shape shown more particularly in Figs. 6, 15, and 16. Its outer or rear end is pivoted to play vertically on a short arm or stud $d^\times$, formed upon or secured to a rear projection of the oblique ear or flange $d^2$ of the knotter-frame above mentioned. A spur or projection $i$ on the inner rear end of the shoe acts as a stop to limit the backward movement of the vibrating knife hereinafter described. A projecting ear or curved guard $i'$ on the opposite wall of the shoe serves to strip or wipe off the ends of the band from the holder-disk, and to prevent said ends from adhering to and again being carried into the shoe by said disk. The holder-disk J is formed upon or secured to that end of a short sleeve $j$ nearest the knotter. A pinion J' is secured to the opposite end of this sleeve, which is journaled on another short tubular shaft $j'$, secured to the oblique flange $d^2$, above mentioned, in such manner as to bring the shaft $j'$ in oblique relation to the cam-wheel C; the edge or a principal flange $c^2$ of which engages or passes diagonally between the teeth of the pinion J', Fig. 8, thus holding the pinion and holder-disk against turning in either direction until the moment when the inclined ways or teeth $c^3$ in said flange act on and partly rotate the pinion, and consequently the disk, to engage the cord laid in the notches of the disk by the needle and carry it into the shoe I to clamp the cord.

A knife $k$ is secured on that end of a rock-shaft $k'$ nearest the knotter and beneath it and the holder. This rock-shaft is journaled in the same short tubular shaft $j'$ above mentioned on which the holder-disk and pinion turn, and extends through it. A short obliquely-arranged lever $k^2$, Figs. 5, 8, and 15, secured on the projecting opposite end of this shaft, is actuated at proper intervals by an inclined lug, flange, or wiper $c^4$ on the front side of the cam-wheel C, once during each revolution of the latter, to cut the cord, as hereinafter explained. The lever $k^2$ vibrates parallel with the flange $d^2$, and is provided with a sector-shaped socket $l$, Fig. 15. One end of a spiral spring $l'$ in this socket bears against its wall, while the other bears against a spur $k^3$ on the flange, Fig. 13, which projects into said socket, and thus serves to retract the knife when forced forward by the cam. The stop $i$ on the shoe limits the backward movement of the knife, as above explained.

Figure 17:
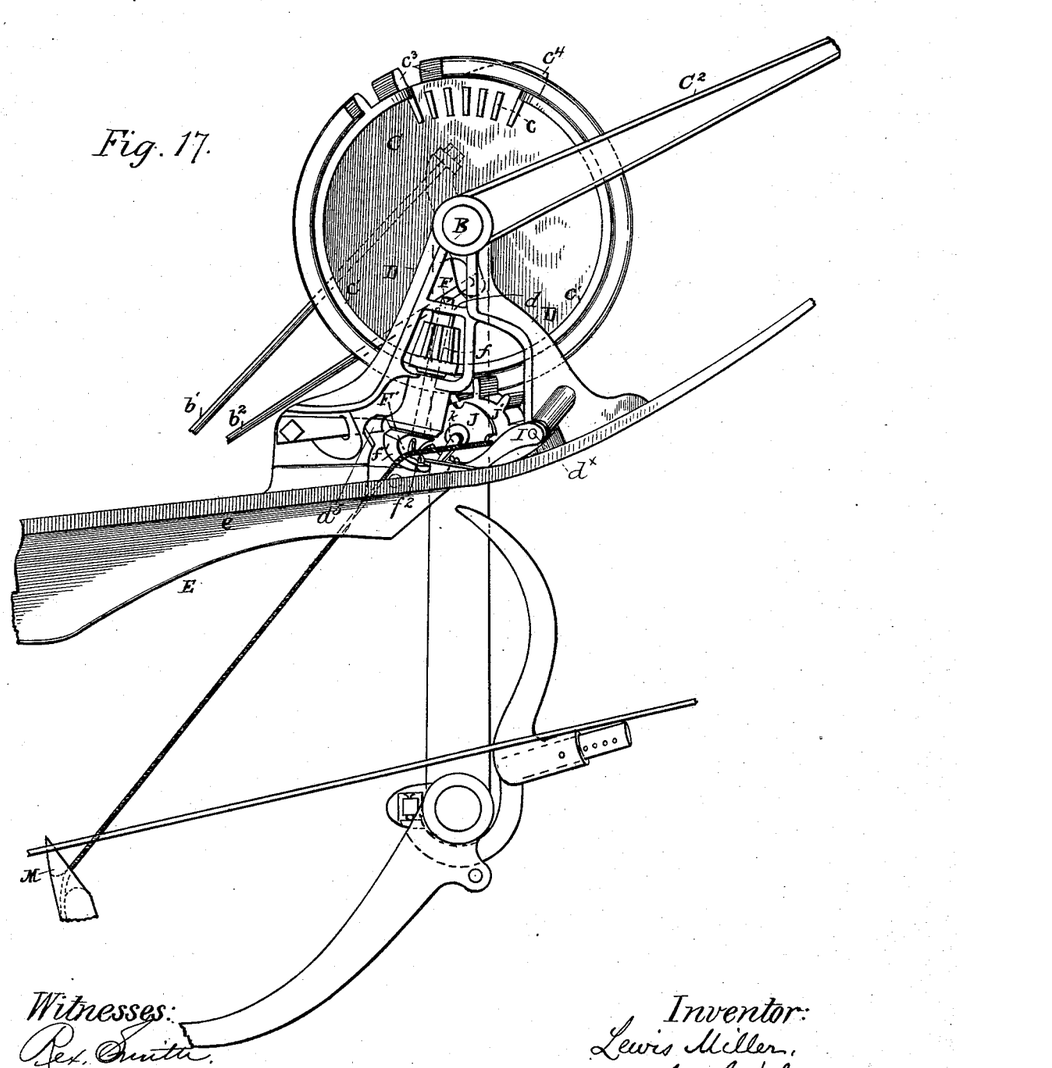
Fig. 17 is a rear elevation showing the needle or binder-arm, partly broken away, depressed with the cord extending therefrom over the cord-guide or finger and tying-bill or knotter to the holder in position to receive the inflowing gavel, the parts occupying their normal attitude.
Figure 18:
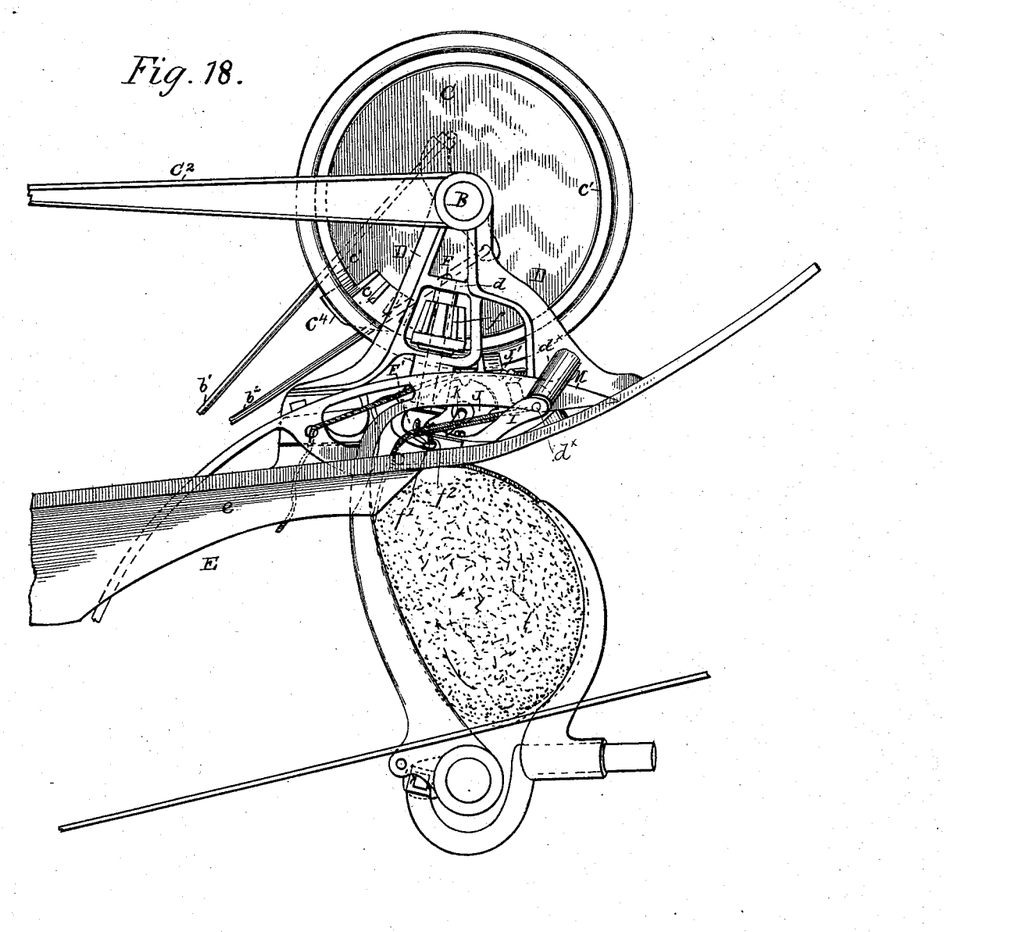
Fig. 18 shows a similar view, but with the binder-arm advanced, the gavel compressed, and the second strand laid over the guide-finger, tying-bill, and holder prior to the commencement of the formation of the knot.
Figure 19:
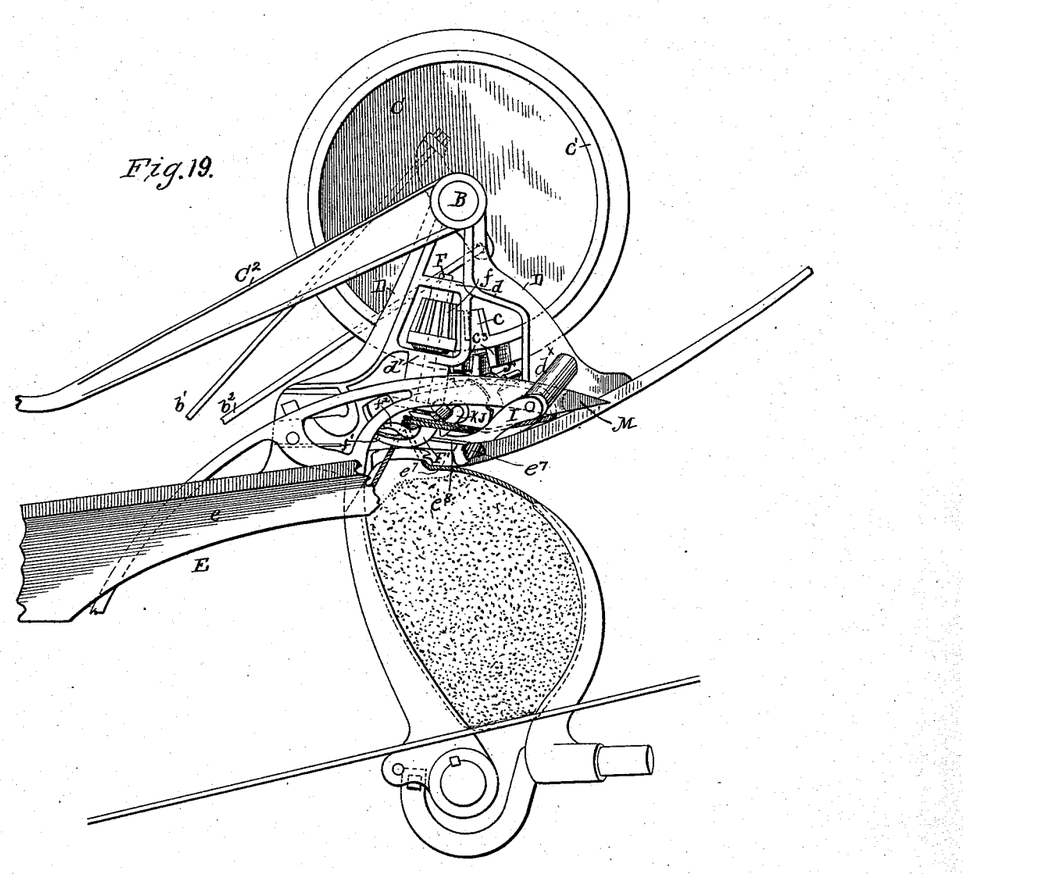
Fig. 19 shows a similar view, the tying-bill having advanced one-quarter of a revolution and beginning to open its jaws to receive the strands, the holder also having partly turned, carrying the strands downward toward the axis of the tying-bill.
Figure 20:
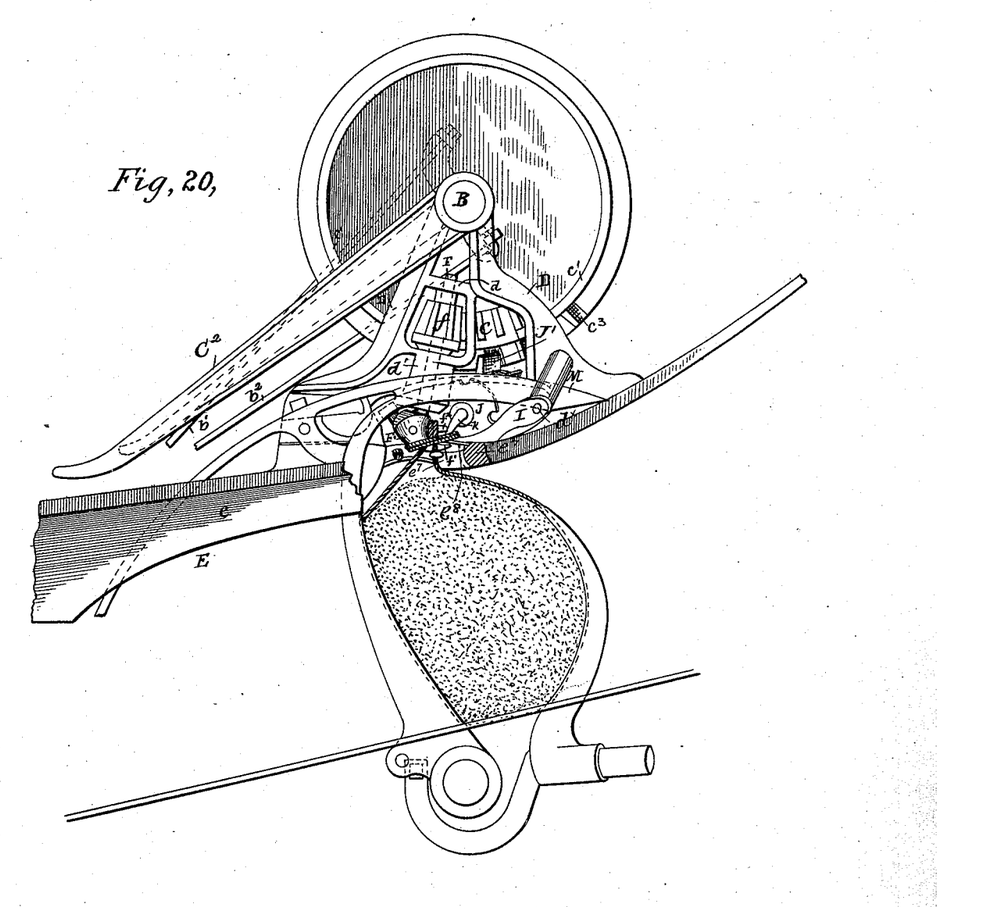
Fig. 20 shows the attitude assumed just before the cords are clamped in the tying-bill jaws and cut by the knife.
Figure 21:
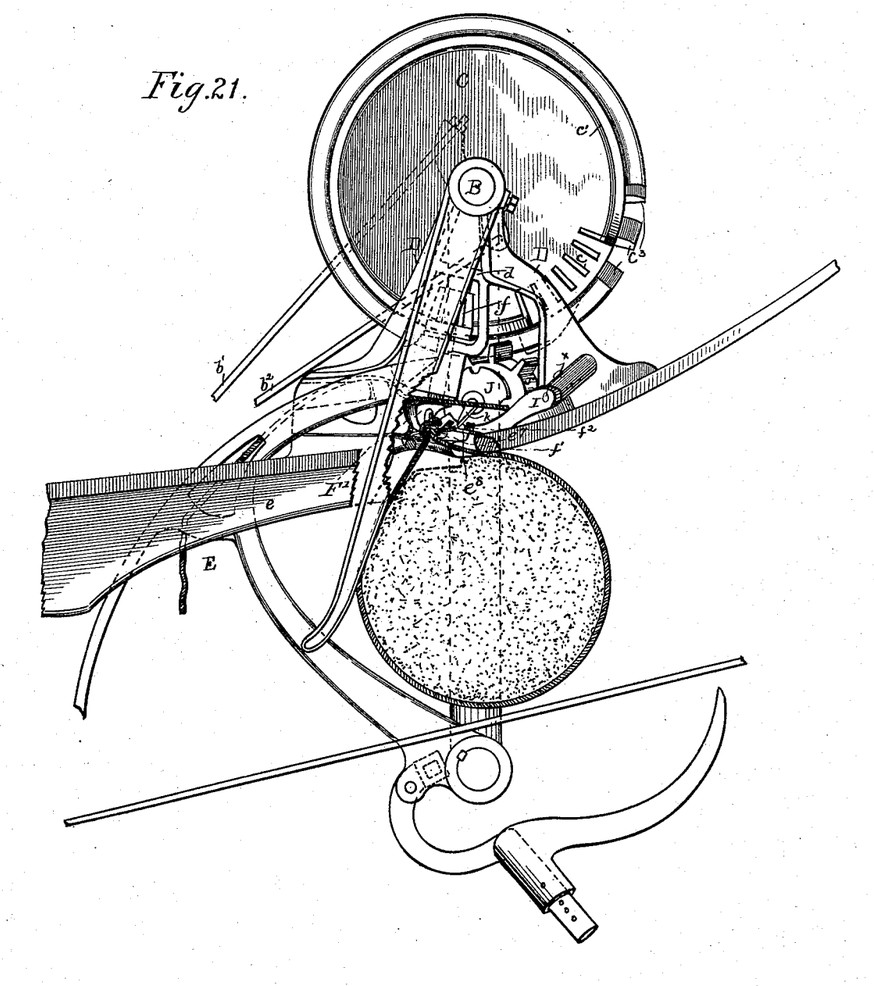
Fig. 21 shows the attitude at the moment of the stripping of the knot from the tying-bill and the discharge of the bound bundle, the binder-arm having begun to retract, leaving the cord in the holder.
Figure 23:
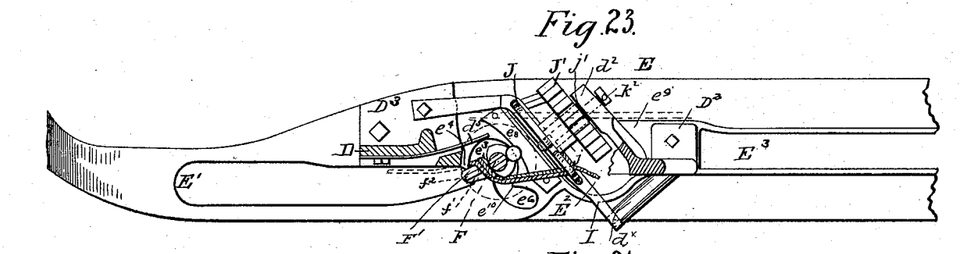
Fig. 23 is a similar view of the attitude represented in Fig. 19; that is, with the binder-arm advanced, the second strand in position, and the tying-bill rotated one-fourth of its circuit.
Figure 24:
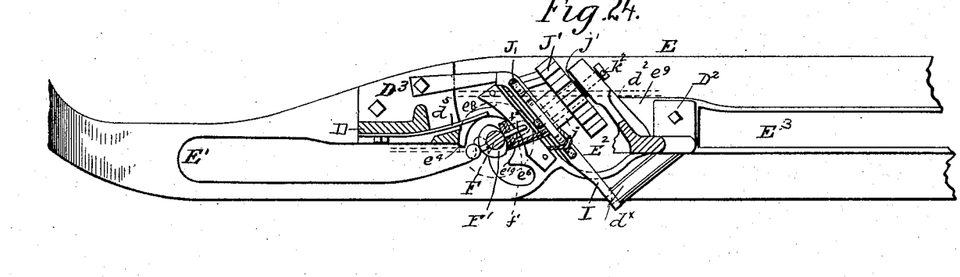
Fig. 24 is a view similar to Fig. 20, showing the attitude just before the strands are cut and clamped.
Figure 25:
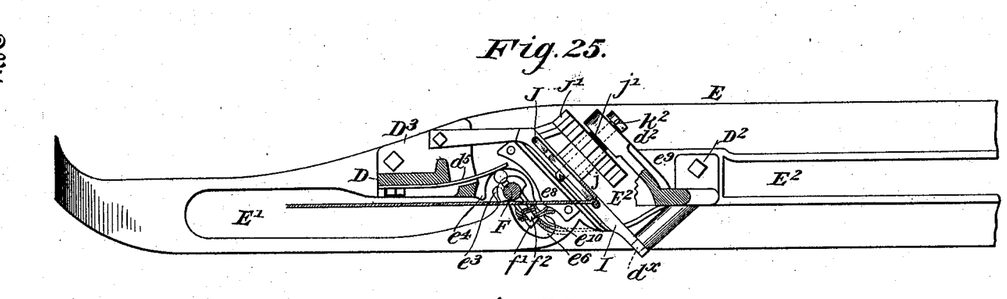
Fig. 25 is a view similar to Fig. 21 with the knot completed, the binder-arm partly retracted, and the first strand clamped in the holder and laid over the tying-bill to form the new knot.
Figure 26:
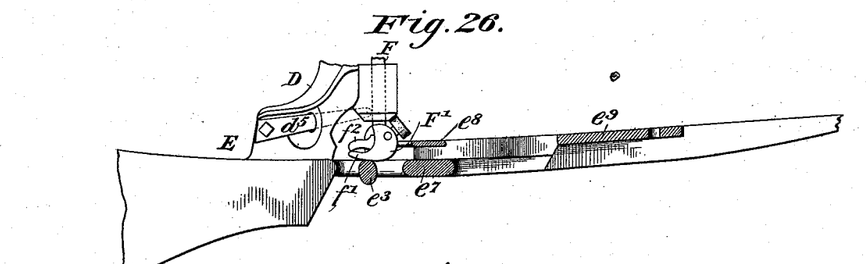
Fig. 26 is a side elevation, partly in vertical longitudinal section, showing the tying-bill as sweeping over the guide-finger in the first half of its revolution, as in Figs. 19 and 23, to strip the strands therefrom to form the knot.
Figure 27:
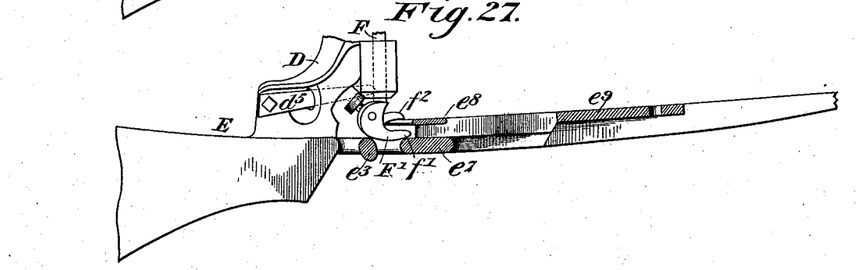
Fig. 27, a similar view showing the bill with its jaws distended and passing during the latter part of its circuit on opposite sides of the bar or plate which guides the strands between the jaws just as they are severed, as in Figs. 20 and 24.

The following is a description of the operation of the apparatus:

The grain is fed forward on the decking beneath the breastplate in the usual way. The needle M rests with its nose just below the decking, (see Fig. 17,) the cord passing therefrom over the guide or stop-finger $e^3$ and the tying-bill or knotter-jaws to the holder. The grain flows against this cord, which pays out from the spool, until the grain bears against the compressing-arms, as usual. As soon as a gavel has accumulated, the mechanism is thrown into gear and the needle advances, compressing the gavel, encompassing it with the cord, and laying the second strand in the holder. (See Figs. 1, 18, and 22.) This latter figure shows the rear side of the knotter-shaft as about in line with the front edge or wall of the slot E' in the breastplate, the rear edge of the notched disk-holder J lying in the same plane. The face of this disk, it will be observed, while substantially parallel with the knotter-shaft, is inclined obliquely forward with reference to the longitudinal axis of the breastplate, so that it is inclined at an angle of about forty-five degrees to the plane in which the cord lies, and its axis is stationary; that is to say, it does not vibrate or change its position, but is always in the same vertical plane. The projections on the knotter-frame are mainly in front of its rear face, so that the binder-arm is enabled to lay the cord close to the knotter-shaft, well onto its bill, while the forward inclination of the rear side of the slot crowds the cord in that direction and prevents any liability of the cord slipping over the nose of the knotter except at the proper moment. The continued rotation of the knotter-actuating shaft B now releases the delay-surface on the knotter-shaft from contact with the lateral flange $c'$, which up to this time has prevented its turning, and the teeth $c$ simultaneously engage with the pinion $f$ and turn the knotter-shaft. At the same moment the holder-disk wheel J', which heretofore had been held stationary by the flange $c^2$ passing between its teeth, is turned by the inclined way or teeth $c^3$ to clamp the cord, the organization being such that the cord is carried downward under the holder, gradually approaching the knotter-spindle while the bill is traversing athwart the line of the slot in the breastplate or the path in which the cord is laid between the holder and knotter. (See Figs. 22, 23, and 24.) This organization and operation cause the cord gradually to slacken as the distance between the point on the holder at which it is clamped and the point where the knot is formed is diminished by reason of the oblique forward movement of the holder, and thus give cord enough to form the knot without undue pull or strain on the cord and without the use of a vibrating or swinging cord-holder, such as has heretofore been used for this purpose, and thus enable me materially to simplify the mechanism while increasing its efficiency. The nose of the knotter in its rotation, which, as shown, is in the direction of the rotation of the hands of a watch, sweeps over the inclined stop-finger $e^3$, carrying the cord with it in the manner shown in Figs. 19, 23, and 26. The jaws of the knotter are gradually opened by the cam as the strands are wound around the knotter. During the latter part of their revolution the jaws are distended, Fig. 27, the lower jaw passing below the guide-bar $e^8$, while the upper one passes above it, and as this bar holds the strands up positively within the circuit of the jaws its proper entrance between them is assured. (See Figs. 11, 20, and 24.) As the jaws pass the guide-bar they are closed by their spring $d^5$, as usual, and clamp the cord securely. At this moment the inclined lug or wiper $c^4$ encounters the handle $k^2$ of the rock-shaft $k'$, which carries the knife, thus severing the cord in front of the holder, but leaving the strand connected with the binder-arm clamped in the holder, as usual. The knotter continues to turn until it has completed its circuit and reached its normal position, Figs. 21 and 25, where it lies parallel with the longer axis of the eye or loop of the slot, when the knot is stripped from the nose of the tying-bill in the usual manner and the bundle discharged.

One of the advantages incident to the organization is its compactness, and as all the parts connected with the formation of the knotwork are between the face of the cam-wheel and the vertical plane of the path of the needle, free access may be had to the various parts for adjustment, replacement, or repair.

The formation of the cord-slot and guide-finger secures the laying of the strands close to the knotter-shaft, prevents their improper escape, and, in connection with the oblique organization of the holder, affords sufficient slack for the proper formation of the knot without the use of a swinging cold-holder.

The curved wall of the slot extending around the tongue or finger $e^3$ serves as a guard to prevent the escape of the cord from the knotter as the latter rotates in forming the loop, as well as a guide to deflect it into proper position, while the large eye or loop beyond the tongue and below the knotter, in connection with the cutting away or shortening of the pendent ribs or guards $e$ $e'$, which, as hereinbefore explained, enable the bundle to be drawn close up to the breastplate, and thus permit the knot to be tied close to the bundle, while properly compressed, obviates the difficulty incident to the ordinary method of tying the knot at a distance from the bundle and the consequent looseness of the band incident thereto.

The oblique arrangement brings the cord-holder close to the knotter and carries the cord toward it, thus enabling the band to be cut close to the knotter and holder, thus preventing unnecessary waste of band material.

Having thus fully described the construction, organization, and operation of my improved grain-binder, what I claim therein as new and as of my own invention is—

1. The hereinbefore-described breastplate having a slot E', for the passage of the needle and cord, extending to a point within the circuit of the nose of the knotter, a shoulder $e^4$ on the front wall of the slot; a guide-finger $e^3$ projecting from the rear wall athwart the slot and past the shoulder; an enlarged eye or loop $e^6$ by the side of the finger; a bridge $e^7$; an opening $E^2$ to receive the cord-holding mechanism, and a second bridge $e^9$ to support a branch of the knotter stand or frame D, as hereinbefore set forth.

2. The combination, substantially as hereinbefore set forth, of a breastplate having a slot for the passage of the needle and cord, extending to a point within the circuit of the nose of the knotter; a guide-finger extending athwart said slot; an enlarged eye or loop by the side of said finger; a bridge $e^7$ at one side of the eye, a guide-bar $e^8$ above and parallel with the bridge, a knotter adapted to sweep first over the finger with its jaws closed to wind the knot around its bill, and then to open its jaws to traverse the guide-bar, and grasp the strands resting thereon just before they are severed, and mechanism substantially such as described for actuating the knotter.

3. The knotter-stand located on one side only of the plane of the needle constructed substantially as described with a plate-shaped body having feet projecting away from the needle-slot; bearings for a knotter-shaft substantially perpendicular to the breastplate, and bearings for a cord-holder, substantially parallel with the breastplate, but oblique to the plane of the needle, as set forth.

4. The combination, substantially as hereinbefore set forth, of a breastplate having a needle-slot therein; a stand mounted thereon; a cord-holding disk turning in bearings therein, practically parallel with the breastplate, but obliquely inclined relatively to the slot; a trough in which the disk turns; a knife; a rock-shaft with which it vibrates, concentric with the disk; and a stop on the trough to limit the movement of the knife.

5. The combination, substantially as hereinbefore set forth, of the cord-holding disk; the knife; the rock-shaft with which it vibrates, concentrically with the disk; the trough in which the disk turns, and the lug or guard $i'$, which removes the cut ends of the cord from the disk.

6. The combination, substantially as hereinbefore set forth, of the driving-cam C; the knife; its shaft inclined obliquely to the face of the cam; the lever $k^2$, thereon; the wiper $c^4$, on the cam, which strikes this lever to vibrate the knife, and the knife-retracting spring inclosed in the lever.

In testimony whereof I have hereunto set my hand this 20th day of April, A. D. 1886.

LEWIS MILLER.

Witnesses:
O. L. SADLER,
W. K. MEANS.